US006047110A

United States Patent [19]

Smith

[11] Patent Number: 6,047,110
[45] Date of Patent: Apr. 4, 2000

[54] METHOD AND APPARATUS FOR IDENTIFYING A PRINT MEDIA TYPE

[75] Inventor: James C. Smith, Escondido, Calif.

[73] Assignee: Hewlett-Packard Company, Palo Alto, Calif.

[21] Appl. No.: 08/871,080

[22] Filed: Jun. 9, 1997

[51] Int. Cl.[7] .......... G06F 15/00

[52] U.S. Cl. .......... 395/111; 399/23

[58] Field of Search .......... 395/101, 106, 395/109, 111, 113, 117; 399/12, 13, 23, 25, 45, 72, 370; 400/103, 104, 107; 358/296, 304, 321, 323; 101/93.03, 93.38, 494, 485, 488; 382/168, 175, 182

[56] References Cited

U.S. PATENT DOCUMENTS

| | | | |
|---|---|---|---|
| 4,533,926 | 8/1985 | Foldvari et al. | 346/136 |
| 4,721,058 | 1/1988 | Hayamizu et al. | 118/665 |
| 4,782,365 | 11/1988 | Takagi | 355/38 |
| 5,138,463 | 8/1992 | Morimoto et al. | 358/296 |
| 5,528,154 | 6/1996 | Leichner et al. | 324/693 |
| 5,563,401 | 10/1996 | Lemelson | 235/494 |
| 5,701,547 | 12/1997 | Yamada et al. | 399/1 |
| 5,781,708 | 7/1998 | Austin et al. | 395/106 |
| 5,816,165 | 10/1998 | Huston | 101/490 |

FOREIGN PATENT DOCUMENTS

| | | |
|---|---|---|
| 0064625A1 | 4/1982 | European Pat. Off. . |
| 4240135A1 | 11/1992 | Germany . |
| 59-182146 | 10/1984 | Japan . |
| 63-120648 | 11/1986 | Japan . |
| 05301673 | 11/1993 | Japan . |

OTHER PUBLICATIONS

European Search Report, EP 98 30 4427, Sep. 23, 1998.

*Primary Examiner*—David K. Moore
*Assistant Examiner*—Gabriel I. Garcia

[57] ABSTRACT

The invention includes a method and apparatus for identifying a media type to be printed upon and communicating the identification to a printer. The method includes the steps of: reading data printed on a leading edge of the media to at least identify the media type; storing the data and employing information from the data to establish printer control parameters; removing the leading portion of the media which contains the data and thereafter printing on the media, as required. Upon occurrence of a later event, data identifying the media is reprinted on a leading edge of the media, which data is derived from data that was stored when the data from the media was initially read. The data printed on the leading edge, in addition to identifying the media type, preferably indicates a remaining length of media available for printing.

20 Claims, 2 Drawing Sheets

METHOD AND APPARATUS FOR IDENTIFYING A PRINT MEDIA TYPE

FIELD OF THE INVENTION

This invention relates to printers which are capable of utilizing multiple types of media and, more particularly, to a method and apparatus for enabling automatic identification of a media type upon a mounting thereof on a printer.

BACKGROUND OF THE ART

Currently, many printers, plotters, etc. are able to utilize various types of media during their respective print actions. Each media type generally requires a resetting of printer parameters in order to optimize print quality. Such media types include special papers, e.g., matte paper, glossy papers, semi-glossy papers, etc. and various non-paper-based media such as vellum, film, etc. Printer parameter modifications vary with the type of media, and can include changes in color maps and print modes.

Presently, the user must use a display panel on the printer (or a dialog box in the printer driver that is resident on the host computer) to select the type of media that is being loaded into the printer. This action involves the user scrolling through a list of displayed media types, until one appears which matches the media type to be loaded on the printer. Thereafter, the user selects that media type and the printer controller automatically establishes printer parameters in accordance with the selection.

The above-indicated procedure requires that the user know what media type is to be (or has been) loaded on the printer. The media type is generally written on the media box but, as is known, many users do not read either the box or the instructions which accompany the media. Further, once the box is thrown away, the media type data is lost and if the user then re-installs the media on another printer, the user is required to either remember or guess the media type. If a wrong media type is selected, unacceptable print quality can result. As the user is not aware that it is the incorrect media type which has been entered, the blame for the poor print quality is placed upon the printer (and the printer manufacturer), resulting in significant levels of customer dissatisfaction. The problem of multiple media types is especially severe in plotters which employ a multiplicity of media types, depending upon the particular application.

As printers are now marketed on a world-wide basis (along with their respective media), manufacturers generally include multiple foreign language versions of instructions for display on the printer's display panel. If the foreign language instructions are not ready at the time the printer is shipped into a foreign market, the display will be particularly confusing to the user—assuming that the user is unable to understand the instructions which appear on the printer's display. As more media types are developed, user confusion will increase unless steps are taken to automatically identify the media type, upon installation of the media onto the printer.

The prior art has suggested the printing of data on sheets of media to enable the loading of printer parameters directly from media sheets. Other prior art has suggested that special inks be employed which are invisible to the user, but which can be sensed by special optical sensors to enable a loading of parameters into a printer. Still other prior art has suggested the use of printed data on media sheets, which printed data, when subjected to a heating step thereafter becomes invisible. Still other prior art has embedded a memory chip in the end of a media roll, with sense apparatus being utilized to read settings from the chip, as the roll is employed.

Each of the above prior art implementations requires the use of either a special ink, a special sensor, or other apparatus which adds to the cost of media identification.

Accordingly, it is an object of this invention to provide an improved method and apparatus for enabling a printer to automatically identify a media type mounted thereon.

It is another object of this invention to provide an improved method and apparatus for enabling identification of a media type (and other data regarding the media) to a device which employs media wound on rolls.

It is yet a further object of this invention to provide a method and apparatus for identifying a media type that is mounted on a printer, wherein media identification data does not appear on printed media output by the printer.

SUMMARY OF THE INVENTION

The invention includes a method and apparatus for identifying a media type to be printed upon and communicating the identification to a printer. The method includes the steps of: reading data from the media to at least identify the media type; storing the data and employing information from the data to establish printer control parameters; removing the leading portion of the media which contains the data (if the data was printed on the leading edge of the media) and thereafter printing on the media, as required. Upon occurrence of a later event, data identifying the media is reprinted on a leading edge of the media, which data is derived from data that was stored when the data from the media was initially read. The data printed on the leading edge, in addition to identifying the media type, preferably indicates a remaining length of media available for printing.

DETAILED DESCRIPTION OF THE INVENTION

Hereafter, the invention will be described in the context of an inkjet plotter/printer which utilizes a roll of media. It is, however, to be understood that the invention is equally applicable to other types of printers that either employ roll media, folded media or, in certain cases, individual media sheets.

Figure 1:
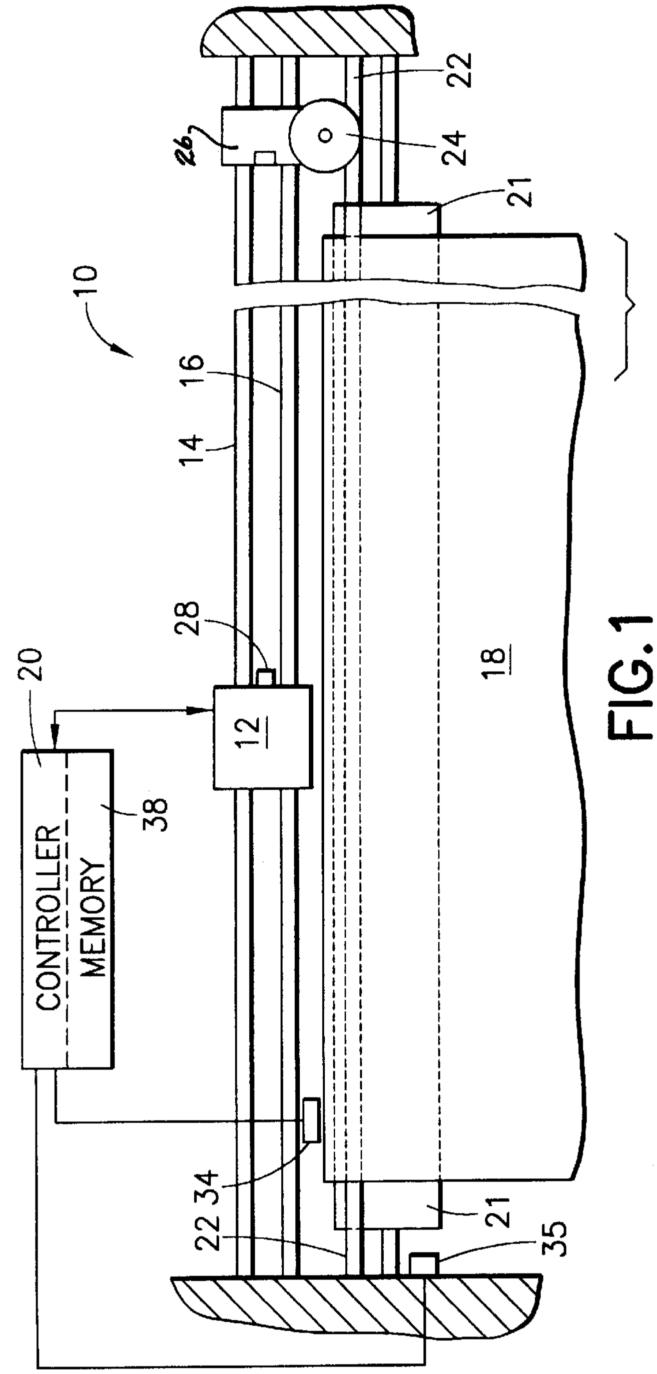
FIG. 1 is a schematic frontal view of a printer employing roll media, which printer is adapted to perform the invention hereof.

Referring to FIG. 1, printer 10 includes an ink jet printhead 12 which translates along a pair of slider bars 14 and 16 across the width of media 18. In the known manner, a controller 20, by control signals sent to inkjet printhead 12 causes printhead 12 to traverse along slider bars 14 and 16 and to eject ink droplets onto media 18 which passes therebeneath. Media 18 passes over a roll 21 which positions media 18 accurately beneath printhead 12 for printing. Media 18 also passes over a cutter bar 22 which, in cooperation with a cutter 24 (similar to a pizza cutter), enables a transverse cut to be made across media 18.

Cutter 24 is mounted on a carrier 26 which is also mounted for sliding movement along slider bars 14 and 16.

When printhead 12 is moved into contact with carrier 26, a coupling mechanism 28 enables carrier 26 to move along with printhead 12 and to cut off a section of media 18.

Figure 2:
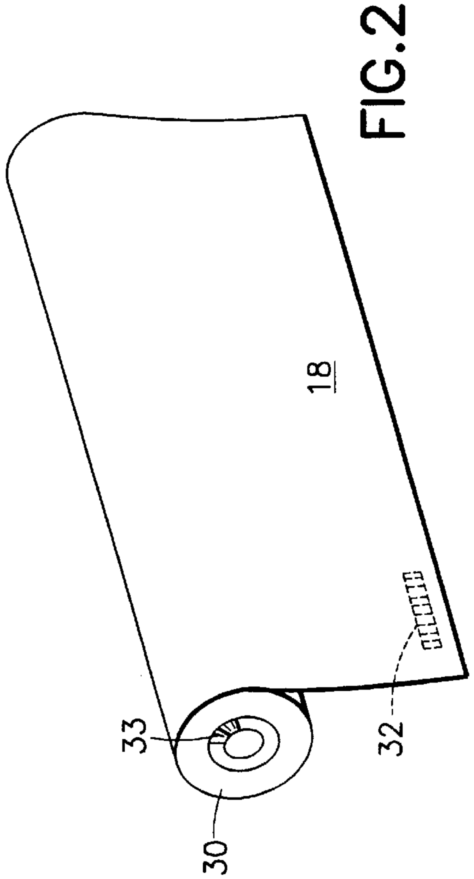
FIG. 2 is a perspective view of a roll of media, showing a positioning of data which identifies, at least, the media type.

Referring to FIG. 2, a roll 30 of media 18 is shown, before mounting on printer 10. In a first embodiment, the leading edge of media 18 includes coded indicia 32 identifies at least, the media type and, preferably, further identifies the size of the media and its remaining length. Coded indicia 32 is initially printed on the leading edge of media 18 when the media is produced at the factory. It may be configured in the form of a bar code or any other indicia which is readable by an optical sensor 34 (see FIG. 1). In a second embodiment, coded indicia 33 may be printed on an end of roll 30 (or applied via a label) where it can be read by a further optical sensor 35 (FIG. 1).

Sensor 34 is positioned to read coded indicia 32 as it passes thereover. Data read from the coded indicia is fed to controller 20 which stores the data in a memory 38. Controller 20 then utilizes the data derived from the indicia to set parameters for control of printer 10 (i.e., in accordance with the media type identified by the coded indicia).

Controller 20 further causes roller 21 to move media 18 a short distance so that coded indicia 32 passes cutter bar 22. Printhead 12 is then moved to engage carrier 26. Thereafter, printhead 12 drags carrier 26 and cutter 24 across media 18, cutting off the portion of media 18 which carries coded indicia 32. Normal printing/plotting then can occur. If the system also employs coded indicia 33 and sensor 35, there is no requirement that the media be initially imprinted with coded indicia 32, thus avoiding the cutting action when a brand new roll is mounted. However, thereafter, as will be understood, the first and second embodiments operate in the same manner.

Figure 3:
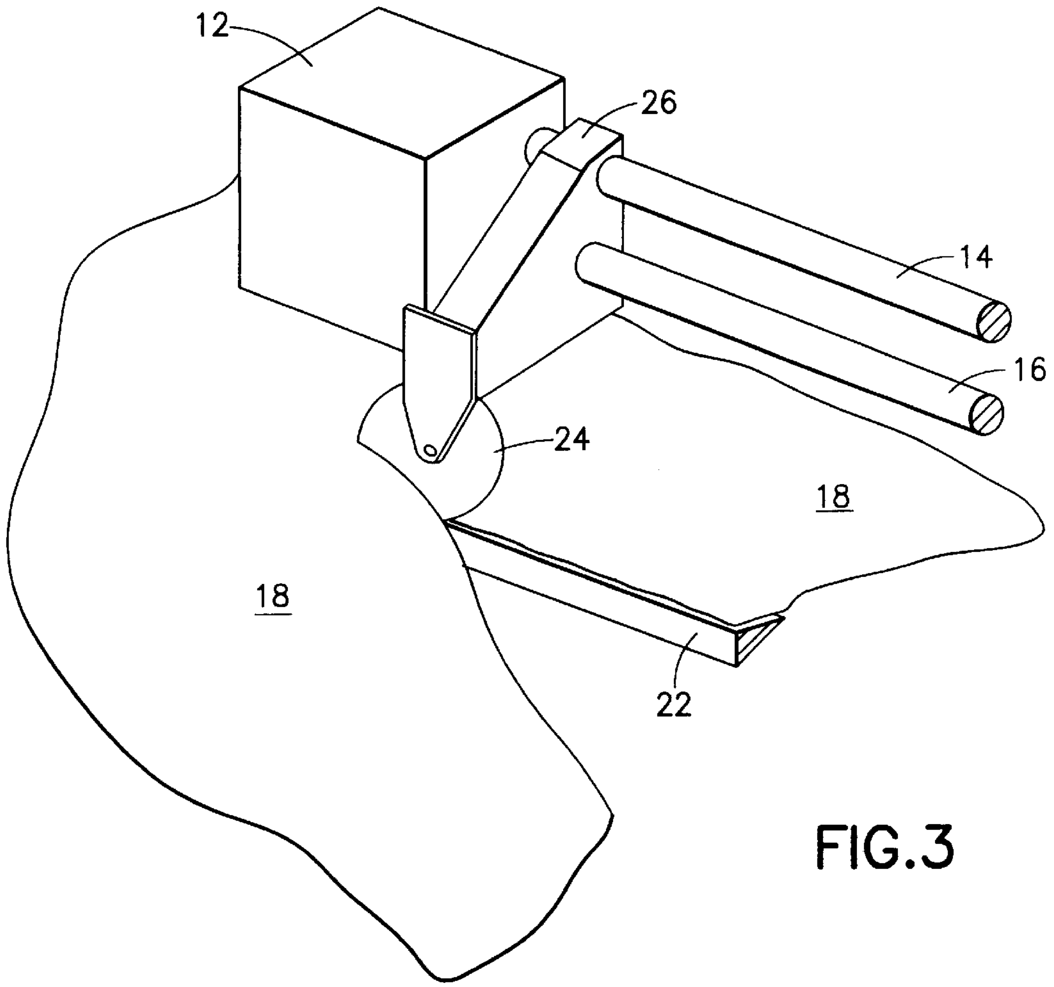
FIG. 3 is a perspective view of a printhead and media cutter employed on the printer of FIG. 1.
Figure 4:
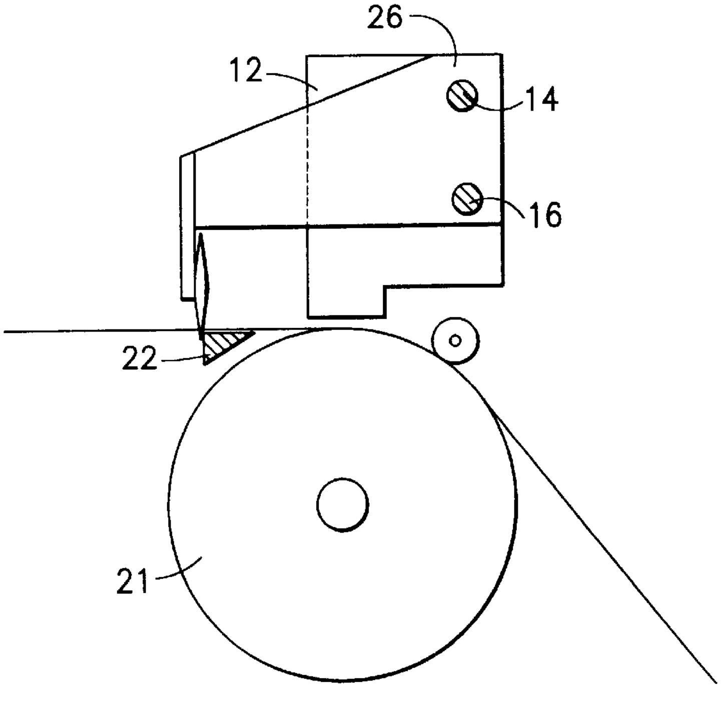
FIG. 4 is a schematic end view of the structure shown in FIG. 3

Referring to FIG. 3, a perspective view illustrates the action of inkjet printhead 12, carrier 26 and cutter 24 as a portion of media 18 is being cut which contains the coded indicia. FIG. 4 illustrates a schematic end view of the structure of FIG. 3, as the cutting action takes place.

Once the section of media 18 which contains coded indicia 32 has been removed, printer 10 is ready to print or plot a print job. When the printing of a sheet is finished, the cutting action, above described, again takes place to enable the printed sheet to be removed from the roll of media 18.

At such time a new coded indicia 32 may be printed on a leading edge of media 18 by printhead 12, or such printing action can be inhibited until requested by the user. The reason for this additional print action is to emplace coded indicia on the media so that the user can change media roll 30 between plots or print jobs. The printer/plotter on the which roll 30 is newly mounted is then able to read the coded indicia and to establish appropriate control parameters. In any event, if both sensors sense coded indicia, the coded indicia on the leading edge of the media governs.

If coded indicia 32 is printed on media 18 after each print job, the disadvantage is that a portion of media 18 which includes coded indicia 32 is cut off before starting each print/plot action. The preferred technique, which is entirely unobtrusive until the user wishes to change the roll of media, is to enable the user to select an "unload" command which enables controller 20 to cause printhead 12 to print coded indicia 30 on the end of media 18. Coded indicia 32, in addition to identifying the media type, also identifies the remaining length of media 18. Such data enables a next printer/plotter on which media roll 30 is mounted to determine the both the available media length and to select proper print control parameters for the media.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for identifying at least a media type to be printed upon to a printer controller in a printer, said method comprising the steps of:

a) reading data printed on a portion of the media which, at least, identifies the media;

b) storing said data and employing said data to establish print control parameters;

c) removing the portion of said media which contains said data; and d) upon an occurrence of an event, printing new data on a further portion of said media, said new data at least identifying said media.

2. The method as recited in claim 1, wherein said data and new data are printed on a current leading edge of said media.

3. The method of claim 2 wherein step c) cuts off said current leading edge before said printer controller causes execution of a print job.

4. The method as recited in claim 1, wherein said data comprises a media type indication and a value indicative of a remaining length of said media.

5. The method as recited in claim 4 wherein step d) prints a revised media length as part of said new data, if portions of said media have been used.

6. The method as recited in claim 1, wherein said media is wound on a roll and said event is a conclusion of a print action on a portion of said media, said portion constituting a single sheet.

7. The method as recited in claim 1, wherein said media is wound on a roll and said event is an indication of a removal of said roll from said printer.

8. Apparatus for identifying at least a media type to be printed upon to a printer controller in a printer, said apparatus comprising:

a transducer for reading data printed on a portion of the media which, at least, identifies the media;

control means for storing said data and employing said data to establish print control parameters;

cutter means responsive to an output from said control means for removing the portion of said media which contains said data; and said control means, upon an occurrence of an event, causing a printing of new data on a further portion of said media, said new data at least identifying said media.

9. The apparatus as recited in claim 8, wherein said data and new data are printed on a current leading edge of said media.

10. The apparatus as recited in claim 9, wherein said cutter means cuts off said current leading edge before said control means causes execution of a print job.

11. The apparatus as recited in claim 8, wherein said data comprises a media type indication and a value indicative of a remaining length of said media.

12. The apparatus as recited in claim 11, wherein a revised media length is printed as part of said new data if portions of said media have been used.

13. The apparatus as recited in claim 8, wherein said media is wound on a roll and said event is a conclusion of a print action on a portion of said media, said portion constituting a single sheet.

14. The apparatus as recited in claim 8, wherein said media is wound on a roll and said event is an indication of a removal of said roll from said printer.

15. A method for identifying at least a media type of media to be printed upon, to a printer controller in a printer, said media wound on a roll, said method comprising the steps of:

a) reading data printed on an end portion of the roll which, at least, identifies the media;

b) storing said data and employing said data to establish print control parameters;

c) upon an occurrence of an event, printing new data on a further portion of said media, said new data at least identifying said media;

d) thereafter, reading said new data printed on said further portion of the roll;

e) storing said data and employing said data to establish print control parameters;

f) removing the further portion of said media which contains said data; and g) upon an occurrence of an event, printing additional new data on a further portion of said media, said additional new data at least identifying said media.

16. The method as recited in claim 15, wherein said new data and additional new data are printed on a current leading edge of said media.

17. The method of claim 15 wherein step f) cuts off said current leading edge before said printer controller causes execution of a print job.

18. The method as recited in claim 15, wherein said data comprises a media type indication and a value indicative of a remaining length of said media.

19. The method as recited in claim 15, wherein said event is an indication of a removal of said roll from said printer.

20. The method as recited in claim 15, wherein said event is a conclusion of a print action on a portion of said media.

* * * * *